United States Patent
Arango et al.

(10) Patent No.: US 10,999,239 B2
(45) Date of Patent: *May 4, 2021

(54) STATEFUL LISP SUBSCRIPTION FOR OVERLAPPING SUBNETWORKS

(71) Applicant: Cisco Technology, Inc., San Jose, CA (US)

(72) Inventors: Jesus Arango, San Ramon, CA (US); Vina Ermagan, San Jose, CA (US); Johnson Leong, Sunnyvale, CA (US); Sanjay Kumar Hooda, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,382

(22) Filed: Dec. 16, 2019

(65) Prior Publication Data

US 2020/0120062 A1 Apr. 16, 2020

Related U.S. Application Data

(63) Continuation of application No. 15/607,248, filed on May 26, 2017, now Pat. No. 10,560,421.

(51) Int. Cl.
*H04L 12/28* (2006.01)
*H04L 29/12* (2006.01)
(Continued)

(52) U.S. Cl.
CPC .......... *H04L 61/103* (2013.01); *H04L 45/586* (2013.01); *H04L 61/2084* (2013.01); *H04L 43/08* (2013.01)

(58) Field of Classification Search
CPC . H04L 61/103; H04L 61/2084; H04L 45/586; H04L 43/08; H04L 1/1835;
(Continued)

(56) References Cited

U.S. PATENT DOCUMENTS 7,333,510 B1 2/2008 Hies et al.
10,560,421 B2 * 2/2020 Arango ................. H04L 45/586
(Continued)

OTHER PUBLICATIONS

Chikara et al. ("Development and Evaluation of LISP-based Instant VPN Services", IEEE, Jul. 7-10, 2013) (Year: 2013).*
(Continued)

*Primary Examiner* — Maharishi V Khirodhar
(74) *Attorney, Agent, or Firm* — Edell, Shapiro & Finnan, LLC

(57) ABSTRACT

A Location/Identifier Separation Protocol (LISP) mapping server, including: a network interface for communicating with a LISP-enabled network; a mapping database; a subscription database; and an overlapping subscription publication engine (OSPE) to: receive a first mapping of a first subnetwork to a first routing locator (RLOC); add the first mapping to the mapping database; receive from a first ingress tunnel router (ITR) a subscription request for an endpoint identifier (EID) within the first subnetwork; add to a first subscription entry for the first subnetwork in the subscription database a subscription for the first ITR; receive a second mapping of a second subnetwork to a second RLOC, wherein the second subnetwork overlaps the first subnetwork; add the second mapping to the mapping database; and copy at least part of the first subscription entry to a second subscription entry for the second subnetwork.

20 Claims, 11 Drawing Sheets

(51) Int. Cl.
*H04L 12/713* (2013.01)
*H04L 12/26* (2006.01)

(58) Field of Classification Search
CPC ... H04L 5/0055; H04L 5/0048; H04L 5/0057; H04L 1/1812; H04L 5/001; H04L 47/827; H04L 1/187; H04L 67/325; H04L 45/245; H04L 43/0888; H04L 67/28; H04L 47/27; H04L 1/16; H04L 47/41; H04L 43/0864; H04L 67/02; H04L 43/0835; H04L 1/1854; H04L 5/0094; H04W 72/14; H04W 72/0446; H04W 72/042; H04W 36/0085; H04W 36/0094; H04W 24/10; H04W 72/046; H04W 16/28; H04J 11/0076; H04J 11/0073; H04B 7/0626; H04B 17/309; Y02D 50/30; H05K 999/99
See application file for complete search history.

(56) References Cited

U.S. PATENT DOCUMENTS

2013/0058345 A1 3/2013 Kano
2014/0140244 A1 5/2014 Kapadia et al.
2016/0065531 A1* 3/2016 Xiaopu ............... H04L 61/103
                                                    709/238
2017/0316106 A1* 11/2017 Pillay-Esnault ...........................
                                                    H04W 12/00518

OTHER PUBLICATIONS

Cisco (Using NAT in Overlapping Networks, Documant ID=13774, Aug. 10, 2005) (Year: 2005).*
Taeyeol Jeong et al. (LISP controller: a centralized LISP management system for ISP networks, 2015, Department of Computer Science and Engineering, POSTECH, Pohang, Korea Division of IT Convergence Engineering, POSTECH, Pohang, Korea). (Year: 2015).*
Yizhen, "NEMO-based Mobility Management in LISP Network", Oct. 2014, pp. 23-35.
Bohao et al., "SAT-GRD: An ID/Loc Split Network Architecture Interconnecting Satellite and Ground Networks", May 22-27, 2016, 6 pages.
R. Raszuk et al., "Simple Virtual Aggregation (S-VA)", Internet Engineering Task Force (IETF), Request for Comments: 6769, Category: Informational, ISSN: 2070-1721, Oct. 2012, 8 pages.
M. Boucadair et al., "LISP Subscription draft-boucadair-lisp-subscribe-03", Network Working Group, Internet—Draft, Intended status: Standards Track, Jul. 25, 2016, 19 pages.
Michael et al., "FIRMS: A mapping system for future Internet Routing", IEEE, 2010, 6 pages.

* cited by examiner

STATEFUL LISP SUBSCRIPTION FOR OVERLAPPING SUBNETWORKS

CROSS-REFERENCE TO RELATED APPLICATION

This application is a Continuation Application of U.S. patent application Ser. No. 15/607,248 filed on May 26, 2017, the contents of which are hereby incorporated by reference in its entirety for all purposes.

FIELD OF THE SPECIFICATION

This disclosure relates in general to the field of computer networking, and more particularly, though not exclusively to, a system and method for stateful LISP subscriptions for overlapping subnetworks.

BACKGROUND

Locator/ID Separation Protocol (LISP) is a mapping protocol that enables endpoints located in different subnetworks to communicate with one another by encapsulating packets and mapping them to an appropriate subnetwork.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
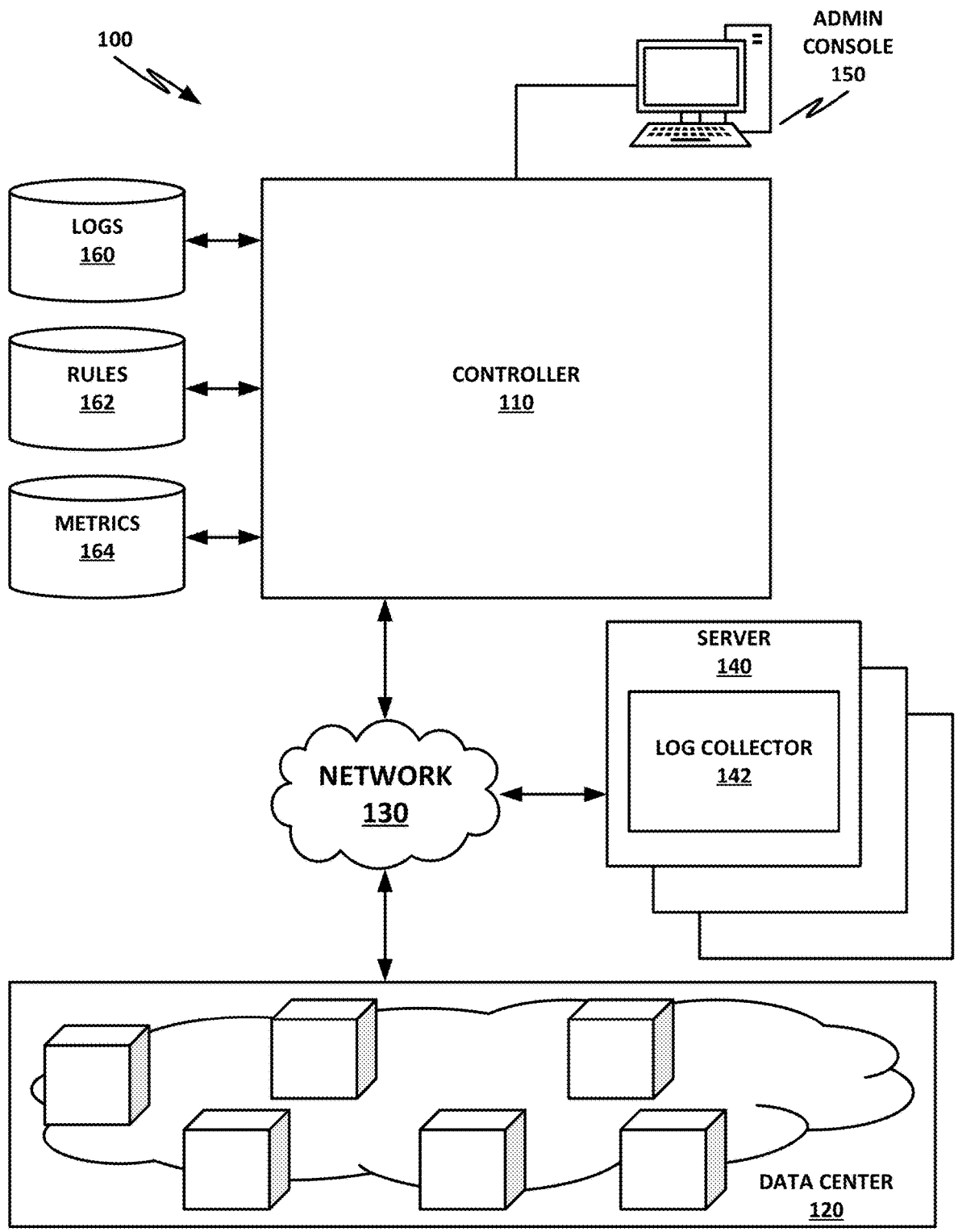
FIG. 1 is a block diagram of a cloud ecosystem according to one or more examples of the present specification.

In an example, there is disclosed a computing system, including: a Location/Identifier Separation Protocol (LISP) mapping server, including: a network interface for communicating with a LISP-enabled network; a mapping database; a subscription database; and an overlapping subscription publication engine (OSPE) to: receive a first mapping of a first subnetwork to a first routing locator (RLOC); add the first mapping to the mapping database; receive from a first ingress tunnel router (ITR) a subscription request for an endpoint identifier (EID) within the first subnetwork; add to a first subscription entry for the first subnetwork in the subscription database a subscription for the first ITR; receive a second mapping of a second subnetwork to a second RLOC, wherein the second subnetwork overlaps the first subnetwork; add the second mapping to the mapping database; and copy at least part of the first subscription entry to a second subscription entry for the second subnetwork.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Furthermore, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

LISP is a protocol that enables endpoints located in different subnetworks to be able to communicate with one another. Absent LISP or a suitable replacement, endpoints on the 10.1/16 subnetwork, for example, would not be able to communicate with endpoints on the 10.2/16 subnetwork (for instance, because the EIDs are not routable within the WAN, e.g., they could be private IP space).

To enable this communication, LISP provides both mapping and encapsulation protocols for endpoint traffic. For example, a LISP deployment may include a mapping server that maps endpoints in a particular subnetwork to a routing locator (RLOC) that services the subnetwork. Communication between the endpoints then occurs via a series of ingress tunneling routers (ITR) and egress tunneling routers (ETR), which may be referred to generically as an xTR. In some embodiments, the ETR and ITR may be collocated on the same hardware, while in other embodiments, they may be provided by different hardware. Individual endpoints sitting behind an xTR may be identified by an endpoint identifier (EID).

By way of example, an endpoint at EID 10.1.0.1/32 may want to communicate with an endpoint at 10.2.0.1/32. The endpoint at 10.1.0.1/32 sends a network packet out to the ITR servicing the 10.1/16 subnetwork with a destination IP address of 10.2.0.1. The ITR then queries the mapping server to identify an RLOC for 10.2.0.1/32. The mapping server queries its mapping database and finds that the 10.2/16 subnetwork is serviced by a particular ETR with an associated RLOC. The mapping server then responds to the ITR with the RLOC for the ETR servicing the 10.2/16 subnetwork.

The ITR servicing the 10.1/16 network encapsulates the EID header with a LISP header and RLOC header for the specific destination node around the regular TCP/IP header, in this case 10.2.0.1/32. The ITR then routes the packet to the ETR servicing the 10.2/16 subnetwork.

When the ETR servicing 10.2/16 receives the encapsulated LISP packet, it decapsulates the packet and forwards it to the appropriate EID, in this case 10.2.0.1/32.

If 10.2.0.1/32 needs to respond to 10.1.0.1/32, the process may be reversed. 10.2.0.1/32 forwards a response packet to its local ITR, which may be optionally on the same hardware as the ETR. The ITR queries the mapping server, receives the RLOC for the ETR servicing 10.1/16, wraps the packet with a LISP header, and routes the packet appropriately. When the target ETR receives the packet, it decapsulates the packet and forwards it to the EID 10.1.0.1/32.

One feature of some LISP embodiments is that the mapping provided by the mapping server is stateless. In other words, the mapping server does not maintain records of which ITRs have requested RLOCs for which ETRs or subnetworks. Having a stateless LISP deployment simplifies the design of the LISP mapping server, and reduces its storage needs.

Because it is inefficient for the ITRs to query a mapping database every time they need to forward a packet to a particular subnetwork, LISP also incorporates a concept of a time to live (TTL). When an ITR queries the mapping server for a particular EID, the mapping server may respond with the RLOC for the ETR servicing that subnetwork, and may append thereto a TTL. The ITR can then continue to use that RLOC for routing traffic to the subnetwork until expiry of the TTL. When the TTL expires, the ITR again queries the mapping server for the RLOC of the ETR.

The mapping server populates its mapping database when ETRs register subnetworks that they control. For example, when the 10.1/16 subnetwork first comes online, the ETR servicing that subnetwork may register 10.1/16 to the mapping server, along with its own RLOC.

However, a challenge can arise when a mobility event occurs and the RLOC associated with a subnetwork changes. For example, a mobility event may include the failure of an ETR (where it is replaced by a different ETR at a different location), an upgrade of an ETR, change of an ETR property or properties, moving of an ETR from one data center to another, or any other event that changes the RLOC associated with a subnetwork. A mobility event for a virtual machine (VM) could also lead to a similar scenario, wherein the ETRs remain static, but the VR movement results in changes to its servicing ETR.

If a mobility event occurs before expiry of the TTL, then an ITR may attempt to route traffic to the now-stale RLOC for the subnetwork. These attempts to route the traffic may fail, causing disruptions in network services, dropped packets, and other difficulties.

To address the challenges of mobility events that occur during a TTL, certain embodiments of a LISP mapping server may provide a publication/subscription (Pub/Sub) framework.

In those cases, when an ITR requests an RLOC for a subnetwork, it may implicitly or explicitly also subscribe to routing changes for that subnetwork. Thus, if a mobility event occurs and the RLOC changes, when the change occurs, the mapping server may query a subscription database for any ITRs that are subscribed to that subnetwork. The mapping server may then publish to those ITRs the new RLOC for the ETR that is now servicing the subnetwork.

One feature of LISP is the ability to have a hierarchy of overlapping subnetworks. For example, the subnetwork 10/8 may be overlapped by the subnetwork 10.1/16, which may itself be overlapped by the subnetwork 10.1.0/24. Embodiments of LISP can handle these overlapping subnetworks by providing an implicit exception framework.

A LISP mapping server may store its mappings in a radix tree, wherein an EID is matched only to the longest matching prefix. Thus, when an ITR sends a mapping request to an EID, the mapping server returns the RLOC for the narrowest available subnetwork (i.e., longest matching prefix) in the mapping database. For example, if there are entries for 10/8, 10.1/16, and 10.1.0/24, a query for the EID 10.1.0.1/32 will be answered only with the RLOC servicing the 10.1.0/24 subnetwork, because 10.1.0/24 matches the EID, and is longer than both 10.1/16 and 10/8. On the other hand, a query for 10.2.0.1/32 will not map to 10.1/16 or 10.1.0/24, so the longest matching prefix is the RLOC for the ETR servicing 10/8.

The concept of publish/subscribe (Pub/Sub) in LISP introduces some statefulness for the LISP mapping server. The mapping server is stateful to the extent that it maintains a database of ITRs that are subscribed to particular subnetworks. However, the size and complexity of such a database can grow very quickly in the case of overlapping subnetworks.

Consider, for example, the case where an overlapping subnetwork is registered after a request for a superseding subnetwork in the hierarchy. In this case, a first ETR registers the 10/8 subnetwork. After the 10/8 subnetwork is registered, an ITR queries the mapping server for 10.1.0.1/32. The mapping server queries its mapping database and determines that the most specific RLOC available for this subnetwork (longest prefix) is 10/8. The ITR then begins communicating with 10.1.0.1/32 via the provided RLOC. However, a subset of the 10/8 subnetwork may then be registered to a new ETR. For example, it may be determined that traffic to the 10.1/16 subnetwork is such that it is advantageous to dedicate its own ETR to that subnet. Thus, a new ETR is brought online, and the EIDs behind 10.1/16 are moved behind the new ETR, which registers its ownership of 10.1/16 to the mapping server.

In this case, the mapping server has an entry for 10/8 in its subscription database, indicating that the ITR has a subscription to the 10/8 subnetwork. However, it does not have an entry for 10.1/16. Thus, if it does not publish the new RLOC to the ITR, then again the ITR may continue trying to communicate with the 10.1/16 subnetwork via the ETR that services the entire 10/8 address space except for the overlapping 10.1/16 subnetwork. Again, this may cause dropped packets and other difficulties until the miscommunication is repaired.

Thus, it is advantageous when the 10.1/16 subnetwork is registered to the mapping server, for the mapping server to determine that the ITR subscribed to 10/8 should be notified of the new mapping to 10.1/16.

One solution is to statefully keep track of all EID mapping requests and to determine, of the set of ITRs subscribed to the 10/8 subnetwork, which ones also map to the new 10.1/16 overlapping subnetwork. In that case, when the new 10.1/16 subnetwork is registered, the mapping server can publish only to the ITRs that have requested EIDs within the 10.1/16 subnetwork.

This method is not, however, ideal in all cases. In the first place, the mapping server must keep track of all queries so that it can individually map ITRs to the longest prefix for EIDs that they have requested. This can lead to the size of the subscription database becoming unwieldy, as in a large data center millions of such transactions may need to be tracked. A second disadvantage is that when, for example, an ITR sends a mapping request for 10.2.0.1/32, and the mapping server responds with an RLOC for the 10/8 subnetwork, the ITR will internally cache the 10/8 subnetwork mapping, and will attempt to use that mapping for all EIDs in the 10/8 subnetwork. Thus, if the ITR that subscribes to 10/8 via a request for 10.2.0.1/32 later needs to communicate with 10.1.0.1/32, and has not received the new registration for the 10.1/16 subnetwork, it will not be aware of the 10.2/16 subnetwork mapping.

These challenges can be obviated by modifying the method such that any ITR that subscribes to the top level EID prefix in the hierarchy also is automatically subscribed to any overlapping EID prefix registrations that occur in the interim.

For example, consider the case where a first ITR communicates with 10.1.0.1/32, and a second ITR communicates with 10.2.0.1/32. Initially, an ETR servicing the full 10/8 subnetwork registers its RLOC to the mapping server. The two ITRs then send queries for 10.1.0.1/32 and 10.2.0.1/32 respectively. The mapping server responds to these queries with the 10/8 RLOC, and subscribes those ITRs to the 10/8 subnetwork.

Later, a new ETR comes online and registers 10.1/16 to the mapping server. The mapping server then checks its subscription database for the 10/8 subnetwork that the 10.1/16 subnetwork overlaps. Rather than attempting to only subscribe those ETRs that have access to the 10.1/16 overlapping subnetwork—which the mapping server may not know because it may not keep records of every single transaction—the mapping server simply copies the entire 10/8 subscription table to the new 10.1/16 subscription table. The mapping server then publishes to all ITRs subscribed to the 10/8 subnetwork, the new mapping for the 10.1/16 overlapping subnetwork.

In this manner, the size and scope of the subscription table is greatly reduced, the need for the mapping server to keep track of every single transaction is obviated, and it is ensured that ETRs that have subscribed to the 10/8 subnetwork are able to reach the full subnetwork, including any overlapping subnetworks.

A system and method for stateful LISP subscription for overlapping subnetworks will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of an example cloud ecosystem 100 according to one or more examples of the present specification. Cloud ecosystem 100 is an embodiment of one non-limiting example of a system and method for stateful LISP subscription for overlapping subnetworks.

Figure 4:
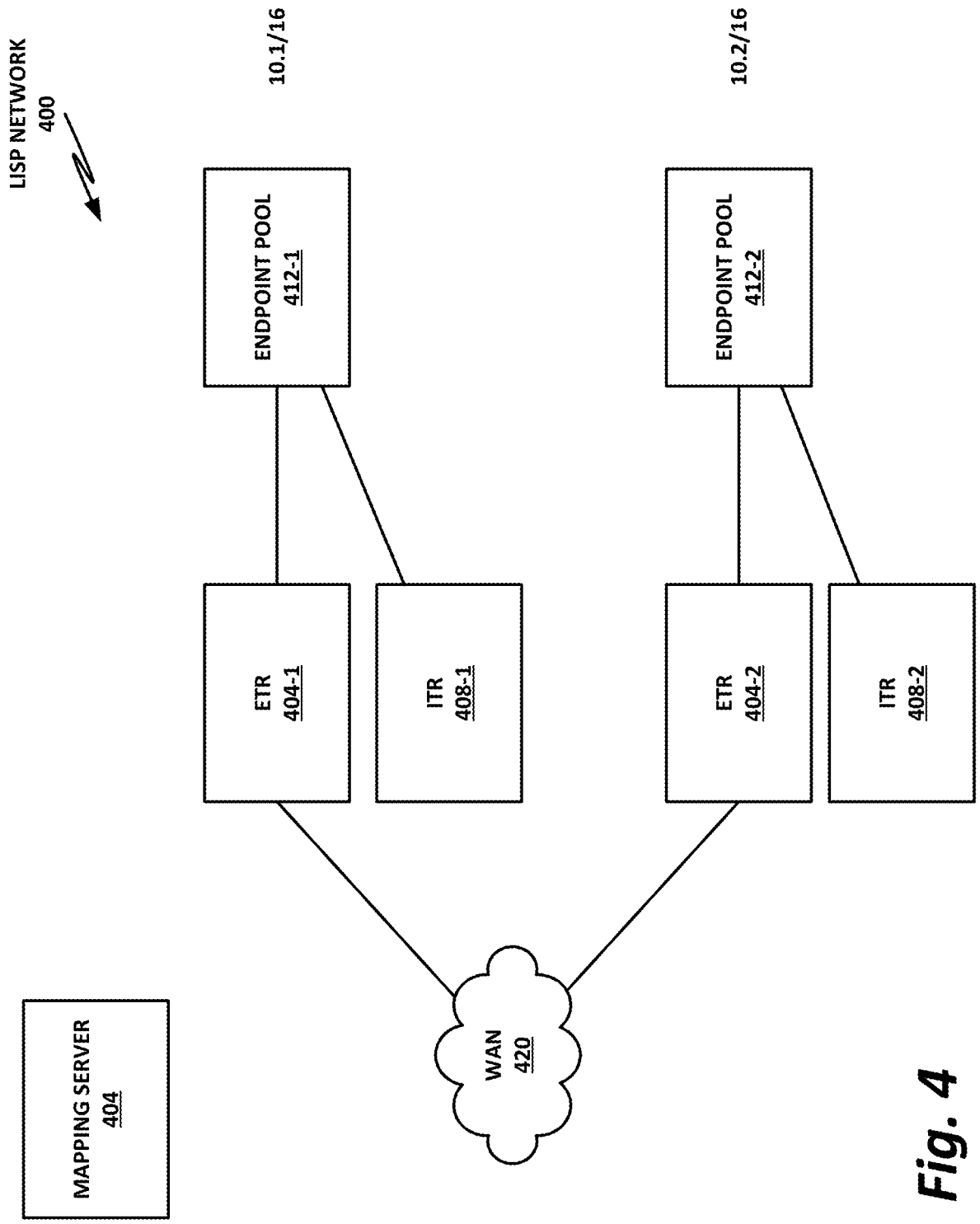
FIGS. 4 and 5 are block diagrams of a LISP network according to one or more examples of the present specification.

In this embodiment, cloud ecosystem 100 may be configured to use LISP to enable endpoints in various subnetworks to communicate with one another. This operation may be facilitated by a controller 110 in data center 120. In certain embodiments, such as those in which data center 120 is an SDN as illustrated in FIG. 4, controller 110 may be an SDN controller (SDN-C). However, not all controllers 110 need necessarily be SDN-Cs, and not all SDN-Cs are configured to function as a controller 110. Thus, the illustrated embodiment should be understood as a non-limiting example, disclosed for the purpose of facilitating discussion and aiding in understanding the present disclosure.

Controller 110 may communicate with various resources of data center 120 (illustrated as cubes) via a network 130. Each resource or manager(s) of said resources can be associated with one or more server 140 implementing a log collector 142 for providing real-time logs and/or metrics associated with the resources to controller 110. Controller 110 can also communicate with the one or more server 140, via the network 130, or via another network not shown in FIG. 1. Log collector 142 can provide real-time logs and/or metrics associated with resources in data center 120, and associated with data center 120 in part or as a whole, to controller 110. To generate logs and/or metrics related to data center 120, server 140 could be communicatively connected to data center 120 directly, via network 130, or via another network not shown in FIG. 1.

Elements of FIG. 1 may be coupled to one another through one or more interfaces employing any suitable connections (wired or wireless), which provide viable pathways for network communications. Additionally, one or more of these elements of FIG. 1 may be combined, divided, or removed from the architecture based on particular configuration needs. Cloud ecosystem 100 may include a configuration capable of transmission control protocol/internet protocol (TCP/IP) communications for the transmission and/or reception of packets in the network. Cloud ecosystem 100 may also operate in conjunction with a user datagram protocol/IP (UDP/IP), any other suitable protocol, or any suitable combination thereof where appropriate and based on particular needs. For purposes of illustrating the techniques of the controller 110, it is important to understand the activities that may be present in cloud ecosystem 100. The following foundational information may be viewed as a basis from which the present disclosure may be properly explained. Such information is offered for purposes of explanation only and, accordingly, should not be construed in any way to limit the broad scope of the present disclosure and its potential applications.

Turning, again, to the infrastructure of FIG. 1, network 130 represents a series of points or nodes of interconnected communication paths for receiving and transmitting packets of information that propagate through the cloud ecosystem 100. Network 130 may be any suitable network or combination of one or more networks operating on one or more suitable networking protocols, including for example, a local area network, an intranet, a virtual network, a wide area network, a wireless network, a cellular network, or the Internet (optionally accessed via a proxy, VM, or other similar security mechanism) by way of nonlimiting example. Network 130 may also include one or more servers, firewalls, routers, switches, security appliances, antivirus servers, or other useful network devices, which in an example may be virtualized within an SDN. In this illustration, network 130 is shown as a single network for simplicity, but in some embodiments, network 130 may include a large number of networks, such as one or more enterprise intranets connected to the internet.

For ease of illustration, however, not all elements of FIG. 1 are depicted with communication lines traversing network 130. In network 130, network traffic, which could include packets, frames, signals, cells, datagrams, protocol data units (PDUs), data, etc., can be sent and received according to any suitable communication messaging protocols. Suitable communication messaging protocols can include a multi-layered scheme such as the Open Systems Interconnection (OSI) model, or any derivations or variants thereof (e.g., Transmission Control Protocol/Internet Protocol (TCP/IP), user datagram protocol/IP (UDP/IP)). A packet is a unit of data for communicating information in a network, and can be routed between a source node (e.g., controller 110) and a destination node via network 130. A packet includes, but is not limited to, a source network address, a destination network address, and a payload containing the information to be communicated. By way of example, these network addresses can be Internet Protocol (IP) addresses in a TCP/IP messaging protocol. Information is generally represented by data and, as used herein, 'data' refers to any type of binary, numeric, voice, video, media, textual, or script data, or any type of source or object code, or any other suitable information in any appropriate format that may be communicated from one point to another in electronic devices and/or networks.

Server 140 can be configured to provide system logs and metrics of the resources in data center 120 to controller 110. System metrics can include information related to or summarizing current system state and/or activity including, but not limited to, number of on-going client operations, current central processing unit (CPU) utilization, disk usage or load on the storage nodes, available network bandwidth, remaining disk input/output operations per second (IOPS), remaining disk bandwidth, etc. In at least one embodiment, these metrics can be pushed to the controller 110 by the metrics collectors in real-time. The controller 110 or server 140 may store the metrics in metrics repository 164, which may be internal to the controller 110 or external (entirely or in part). In other embodiments, server 140 may store real-time system metrics in the metrics repository 164 without accessing the controller 110.

In some cases, server 140 can be configured to log events and activities in data center 120 to controller 110. Logs can include information related to events, errors, device drivers, system changes, etc. In at least one embodiment, these logs can be pushed to the controller 110 by the server 140 in real-time. The controller 110 or server 140 may store the system logs in logs repository 160, which may be internal to the controller 110 or external (entirely or in part). In other embodiments, server 140 may store real-time system logs in the logs repository 160 without accessing the controller 110. In certain embodiments, a log may include object and state pairings.

Controller 110 can be implemented by one or more network elements in cloud ecosystem 100. As used herein, the term 'network element' is meant to encompass servers, processors, modules, routers, switches, cable boxes, gateways, bridges, load balancers, firewalls, inline service nodes, proxies, or any other suitable device, component, element, or proprietary appliance operable to exchange information in a network environment. This network element may include any suitable hardware, software, components, modules, or interfaces that facilitate the operations thereof. This may be inclusive of appropriate algorithms and communication protocols that allow for the effective exchange of data or information.

Figure 2:
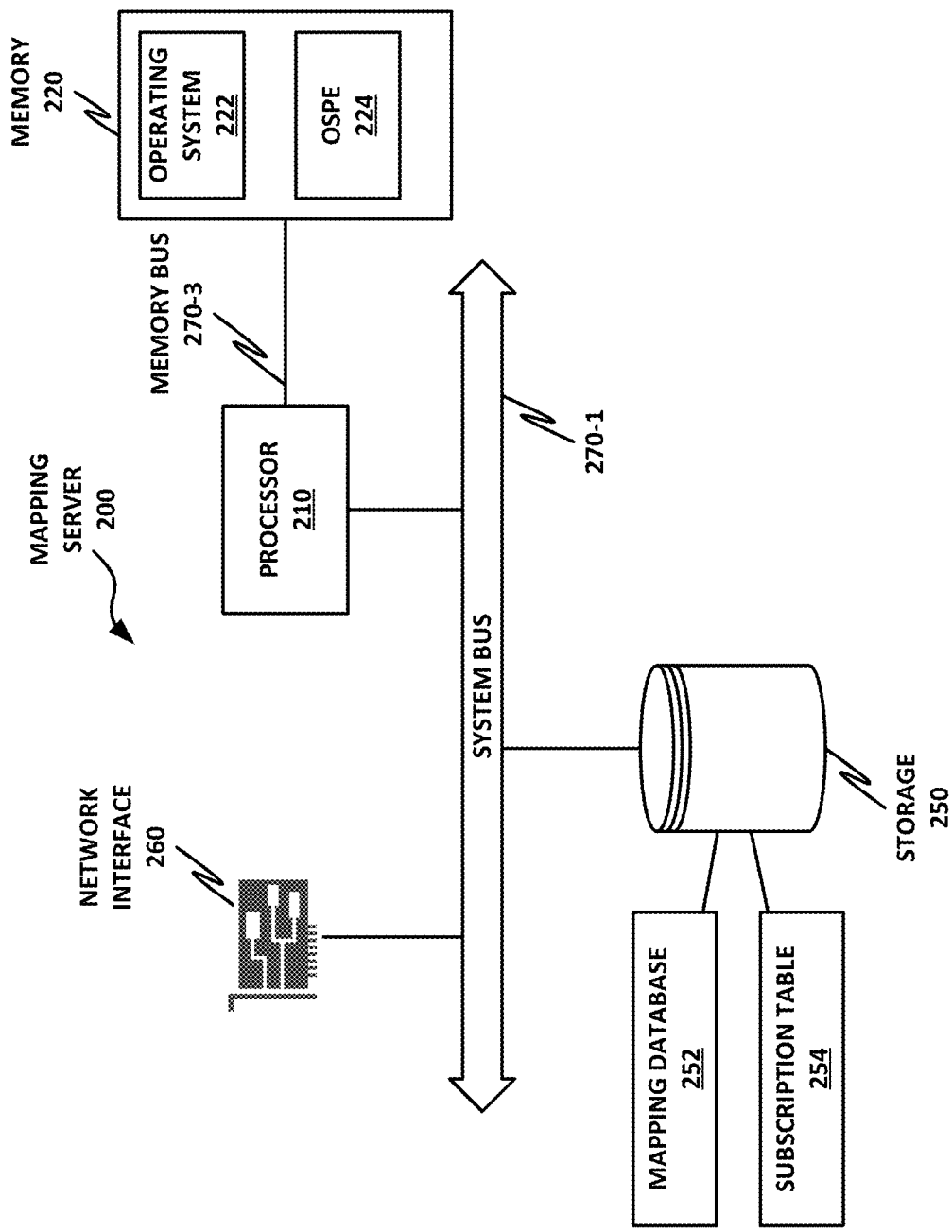
FIG. 2 is a block diagram of a mapping server according to one or more examples of the present specification.

FIG. 2 is a block diagram of a mapping server according to one or more examples of the present specification. The mapping server may be any suitable computing device, and can also be a distributed system. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host." In certain embodiments, administration console 150 may be an example of mapping servers.

Mapping server 200 includes a processor 210 connected to a memory 220, having stored therein executable instructions for providing an operating system 222 and at least software portions of an overlapping subnetwork publication engine (OSPE) 224. Other components of mapping server 200 include a storage 250 (wherein may be stored a mapping database 252 and a subscription database 254), and network interface 260. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Stored within storage 250 may be a mapping database 252 and a subscription database 254. The mapping database 252 enables mapping server 200 to maintain a list of the RLOCs for all ETRs in the LISP network. Subscription table 254 enables mapping server 200 to keep track of which ITRs are subscribed to which RLOCs, for example, in the case of a mobility event. Storage 250 may also include a stored copy of operational software such as operating system 222 and software portions of OSPE 224. Many other configurations are also possible, and are intended to be encompassed within the broad scope of this specification.

Network interface 260 may be provided to communicatively couple mapping server 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

OSPE 224, in one example, is operable to carry out computer-implemented methods as described in this specification. OSPE 224 may include one or more tangible non-transitory computer-readable mediums having stored thereon executable instructions operable to instruct a processor to provide a OSPE 224. As used throughout this specification, an "engine" includes any combination of one or more logic elements, of similar or dissimilar species, operable for and configured to perform one or more methods provided by the engine. Thus, OSPE 224 may comprise one or more logic elements configured to provide methods as disclosed in this specification. In some cases, OSPE 224 may include a special integrated circuit designed to carry out a method or a part thereof, and may also include software instructions operable to instruct a processor to perform the method. In some cases, OSPE 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that OSPE 224 may also include other hardware and software, including configuration files, registry entries, and interactive or user-mode software by way of non-limiting example.

In one example, OSPE 224 includes executable instructions stored on a non-transitory medium operable to perform a method according to this specification. At an appropriate time, such as upon booting mapping server 200 or upon a command from operating system 222, processor 210 may retrieve a copy of the instructions from storage 250 and load it into memory 220. Processor 210 may then iteratively execute the instructions of OSPE 224 to provide the desired method.

Figure 3:
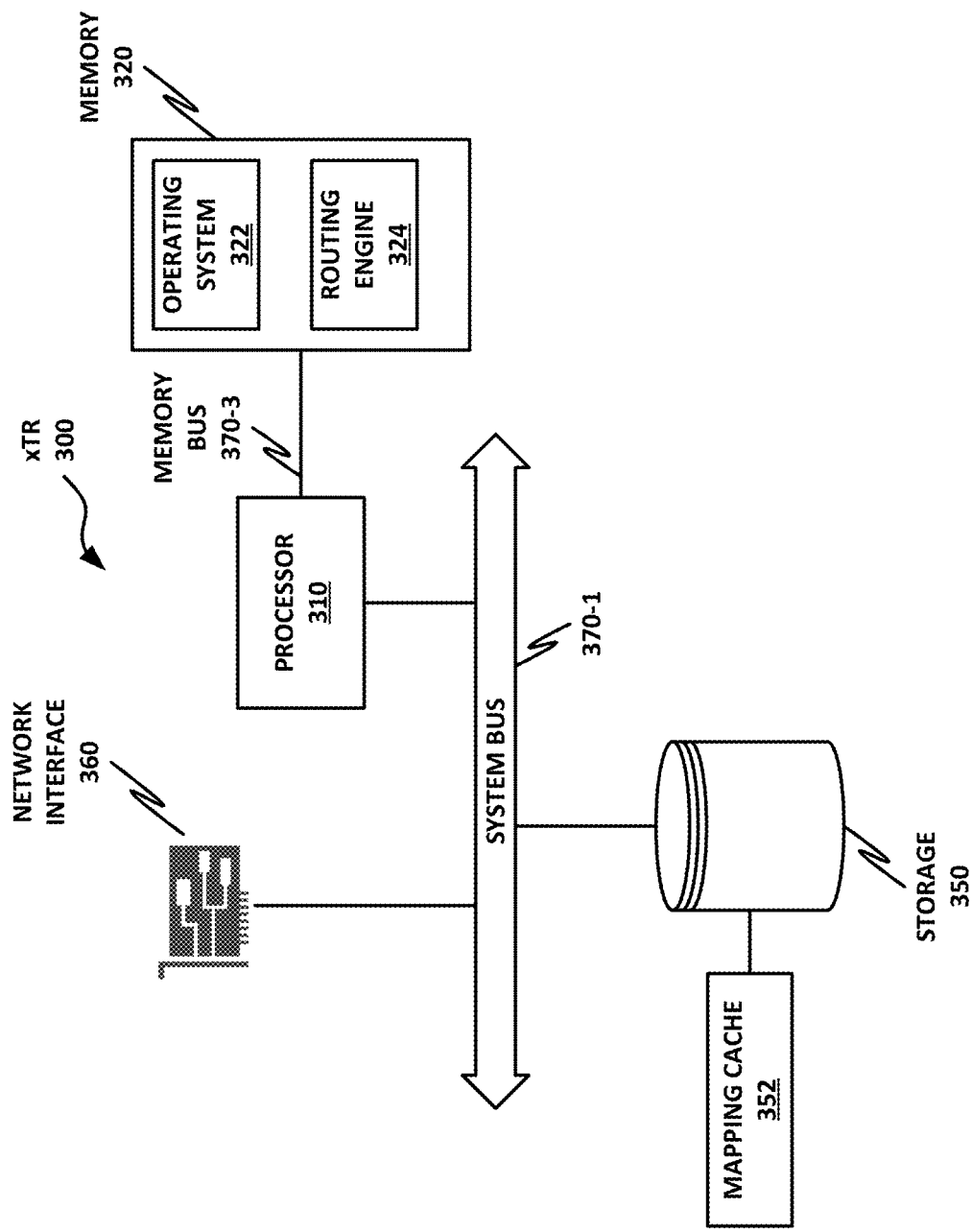
FIG. 3 is a block diagram of a LISP xTR according to one or more examples of the present specification.

FIG. 3 is a block diagram of an xTR 300 according to one or more examples of the present specification. As presently disclosed, xTR 300 may be any suitable computing device, as described in connection with FIG. 2. In general, the definitions and examples of FIG. 2 may be considered as equally applicable to FIG. 3, unless specifically stated otherwise. In the present disclosure, xTR 300 is described separately to illustrate that in certain embodiments, logical operations according to this specification may be divided along a client-server model, while xTR 300 provides certain other centralized tasks. In contemporary practice, xTR 300 is more likely to be provided as a "headless" VM running on a computing cluster, or as a standalone appliance, though these configurations are not required. An xTR may also have a table for the EID prefixes it has subscribed to (updated with new subscriptions or deleting subscriptions, by way of nonlimiting example).

In certain embodiments, controller 110, log collector 142, and data center resources may be embodied as xTRs 300.

Included in xTR 300 is a processor 310 connected to a memory 320, having stored therein executable instructions for providing an operating system 322 and at least software portions of a routing engine 324. Routing engine 324 provides the routing functions for xTR 300. This can include logic to query mapping server 200 of FIG. 2 when routing traffic to an ETR for an EID in a different subnetwork. Routing engine 324 may also include logic for encapsulating and/or decapsulating LISP packets. Other components of xTR 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of routing engine 324.

In storage 350, there is a mapping cache 352. When routing engine 324 queries mapping server 200 for the RLOC of an EID, mapping server 200 may respond with an RLOC associated with a subnetwork containing that EID. Routing engine 324 may then cache that RLOC in mapping cache 352. The cached entry may have a TTL, and after a time, routing engine 324 may explicitly unsubscribe from the RLOC for that subnetwork, or may simply delete the entry after the TTL. A common value for a TTL is approximately 24 hours.

Network interface 360 may be provided to communicatively couple server 140 to a wired or wireless network, and may include one or more logic elements as described in FIG. 2.

Routing engine 324 is an engine as described in FIG. 2 and, in one example, includes one or more logic elements operable to carry out computer-implemented methods as described in this specification. Software portions of server engine 324 may run as a daemon process.

Routing engine 324 may include one or more non-transitory computer-readable mediums having stored thereon executable instructions operable to instruct a processor to provide a security engine. At an appropriate time, such as upon booting server 140 or upon a command from operating system 322 or a user or security administrator, processor 310 may retrieve a copy of routing engine 324 (or software portions thereof) from storage 350 and load it into memory 320. Processor 310 may then iteratively execute the instructions of routing engine 324 to provide the desired method.

FIG. 4 is a block diagram of a LISP network 400 according to one or more examples of the present specification. As described elsewhere in this specification, a mapping server 404 may provide mapping services to LISP network 400.

In a LISP network, a plurality of ETRs 404 service a plurality of subnetworks, which may not be reachable absent a LISP system. A plurality of ITRs 408 provide encapsulation services to carry out those communications. For example, endpoint pool 412-1 includes the subnetwork 10.1/16, and is serviced by ETR 404-1 and ITR 408-1. ETR 404-1 and ITR 408-1 may be embodied in a single device, or in different devices according to the needs of a particular implementation.

Endpoints in endpoint pool 412-1 have EIDs in the 10.1/16 subnetwork. Endpoints in endpoint pool 412-2 are in the 10.2/16 subnetwork, and are serviced by ETR 404-2 and ITR 408-2.

In this example, LISP network 400 is serviced by a wide area network (WAN) 420, which communicatively couples subnetwork 10.1/16 to subnetwork 10.2/16. ITR devices are also connected to the WAN. If the ETR and ITR utilize the same hardware, a single connection to the WAN is sufficient. However, if the ETR and ITR are separate HW devices, then both are connected to the WAN.

When an endpoint in endpoint pool 412-1 wishes to communicate with an endpoint in endpoint pool 412-2, it sends a packet to ITR 408-1, which queries mapping server 404 for an RLOC associated with the particular EID. For example, the packet may have a destination EID of 10.2.0.1/32. ITR 408-1 queries mapping server 404, which looks up the mapping in its mapping database. Mapping server 404 determines that the longest prefix available for 10.2.0.1/32 is the 10.2/16 subnetwork. Thus, mapping server 404 responds to ITR 408-1 with an RLOC for ETR 404-2. ITR 408-1 caches the 10.2/16 subnetwork RLOC, and proceeds to route the packet to ETR 404-2.

Upon receiving the packet, ETR 404-2 decapsulates the packet, determines that its EID is 10.2.0.1/32, and forwards the packet to the internal IP address 10.2.0.1.

If the endpoint at 10.2.0.1 needs to respond, it may forward the response packet to ITR 408-2. The destination EID of the response packet is 10.1.0.1/32. ITR 408-2 queries mapping server 404 for an RLOC for 10.1.0.1/32. Mapping server 404 matches the EID against its mapping database, and determines that the longest prefix for this packet is 10.1/16. Mapping server 404 therefore responds to ITR 408-2 with a mapping to the RLOC for ETR 404-1. ITR 408-2 routes the packet via WAN 420 to ETR 404-1.

ETR 404-1 inspects the packet, determines that it is a valid packet for subnetwork 10.1/16, and forwards the packet to 10.1.0.1/32 in endpoint pool 412-1.

As described above, mapping server 404 may also maintain a subscription database. When an ITR 408 queries mapping server 404 with an EID, mapping server 404 may implicitly create a subscription for the ITR to the RLOC associated with that EID. Alternately, the ITR 408 may explicitly subscribe to that particular subnetwork.

Figure 5:
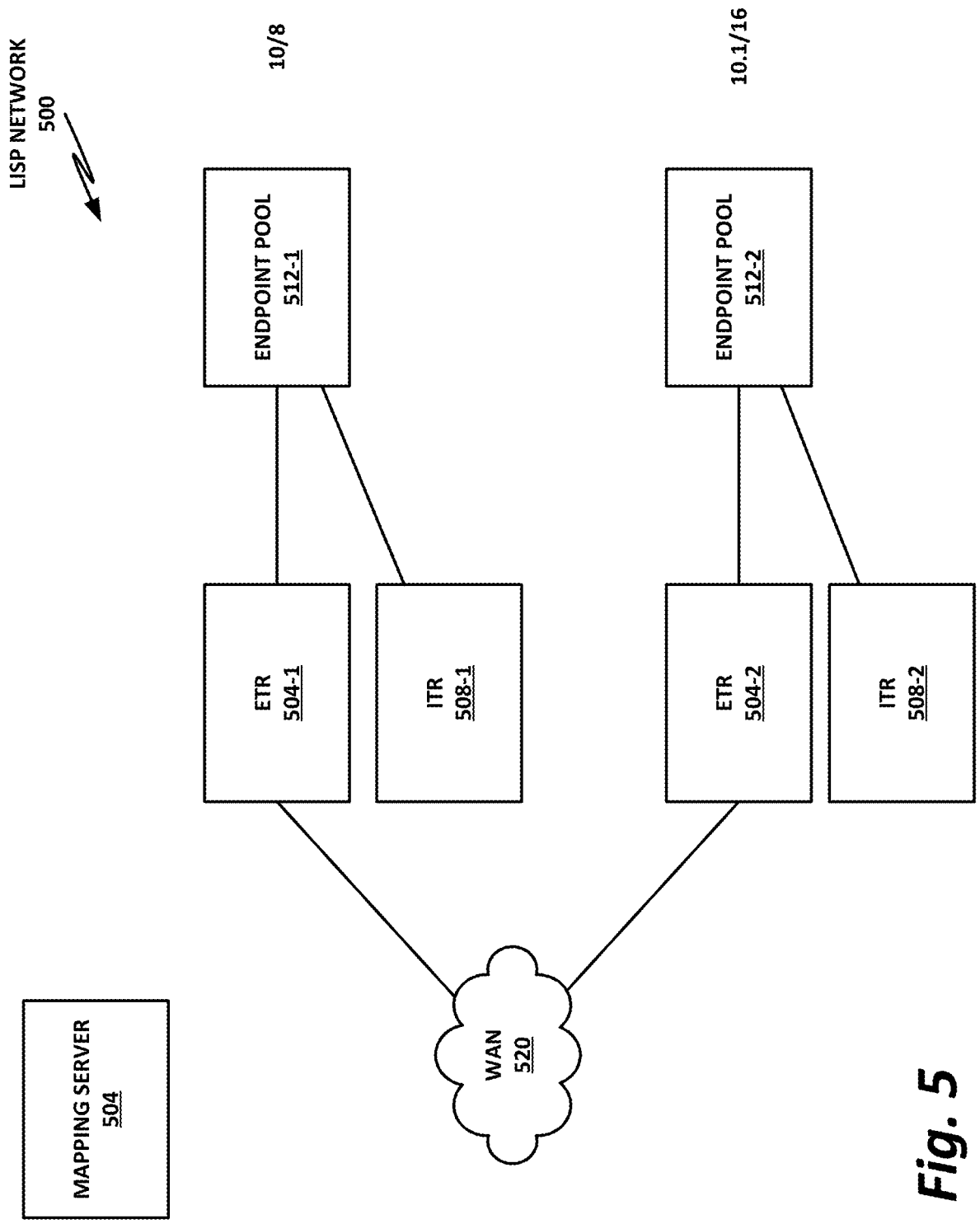

FIG. 5 is a block diagram of LISP network 500 according to one or more examples of the present specification.

Similar to LISP network 400 of FIG. 4, LISP network 500 includes a mapping server 504, and a plurality of subnetworks connected via a WAN 520. In this example, endpoint pool 512-1 contains EIDs in the 10/8 subnetwork. Endpoint pool 512-1 is serviced by ETR 504-1 and ITR 508-1.

However, not all 10/8 EIDs are contained in endpoint pool 512-1. In this case, the overlapping subnetwork 10.1-16 may receive, for example, much more network traffic than other EIDs in the 10/8 subnetwork. Thus, EIDs in the 10.1/16 overlapping subnetwork are aggregated in endpoint pool 512-2. Endpoint pool 512-2 is serviced by ETR 504-2 and ITR 508-2.

As described above, an ITR attempting to route traffic to the 10.1/16 subnetwork will receive the RLOC for ETR 504-2. However, certain challenges may be encountered when an ITR initially is subscribed to the 10/8 RLOC, and ETR 504-2 later registers the 10.1/16 overlapping subnetwork. In this case, the subscription table for 10/8 may be entirely copied to a new subscription table for 10.1/16, and the new 10.1/16 RLOC may be published to all ITRs that were subscribed to the 10/8 RLOC.

FIGS. 6-11 are block diagrams of a LISP network according to one or more examples of the present specification. These figures illustrate a step-by-step example of such a situation. In each figure, ITRs 604-1 and 604-2 may issue queries to mapping system 600 for EIDs serviced by ETRs 608-1 and 608-2. Mapping system 600 maintains mapping tables and subscription tables as illustrated in the space above mapping system 600.

Figure 6:
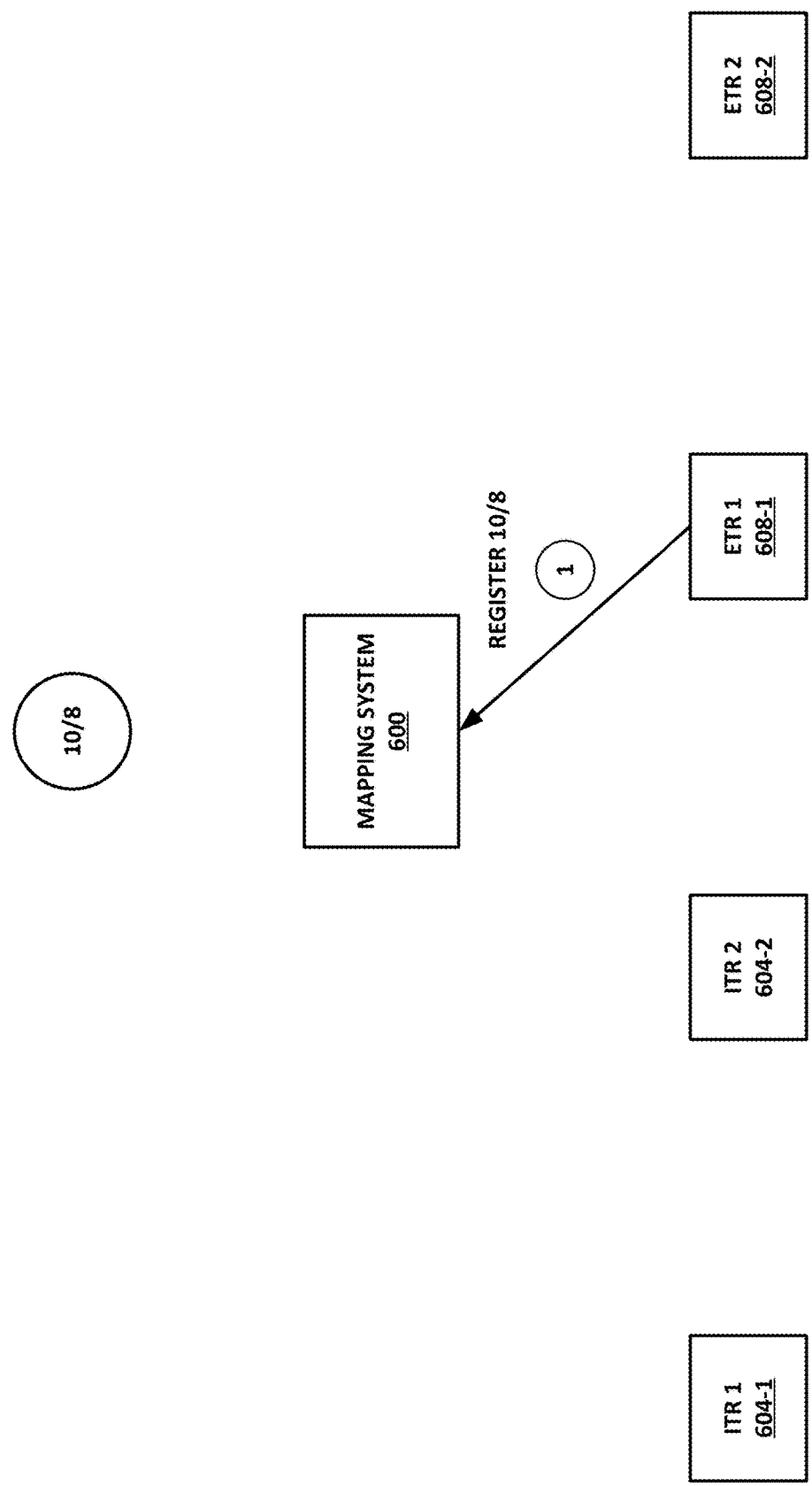
FIGS. 6-11 are block diagrams further illustrating a LISP network according to one or more examples of the present specification.

Starting in FIG. 6, at operation one, ETR 1 608-1 registers the 10/8 subnetwork to mapping system 600. Mapping system 600 registers the mapping, such as in a radix tree.

Figure 7:
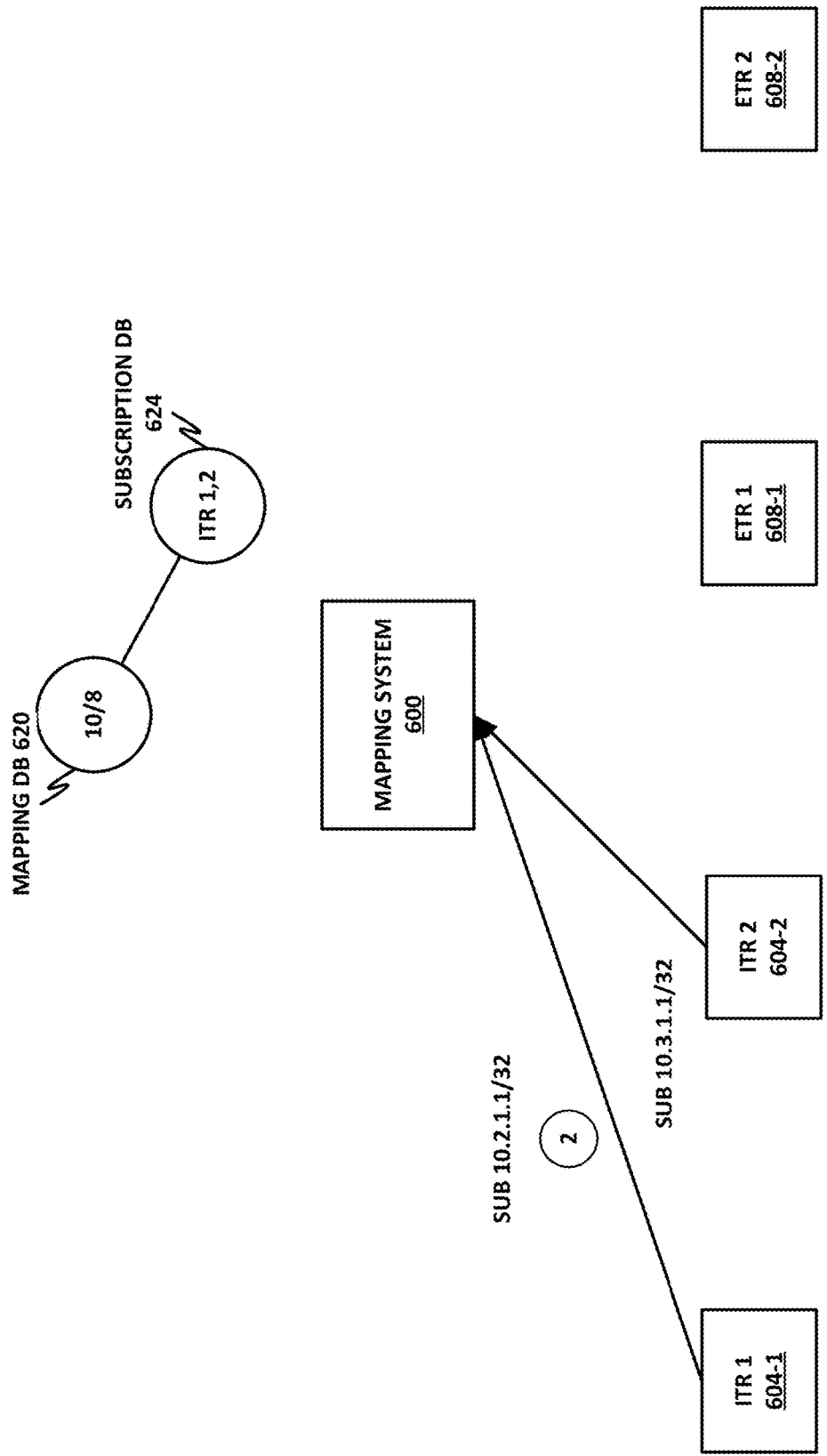

Turning now to FIG. 7, data packets trigger the creation of subscription states for ITR 1 604-1 and ITR 2 604-2.

ITR 1 604-1 sends a mapping request to mapping system 600 for EID 10.2.1.1/32. Mapping system 600 searches its radix tree to determine the longest matching prefix, which in this case is 10/8. Mapping system 600 stores an entry for ITR 1 in its subscription table for the 10/8 prefix. In another embodiment, mapping system 600 might reply with the RLOC mapping, causing the ITR to explicitly subscribe to the 10/8 prefix.

Also in this figure, ITR 2 604-2 queries mapping system 600 for EID 10.3.1.1/32. Mapping system 600 searches its radix tree and determines that 10/8 is the longest matching prefix. Therefore mapping system 600 creates an entry in subscription DB 624 for ITR 2.

Figure 8:
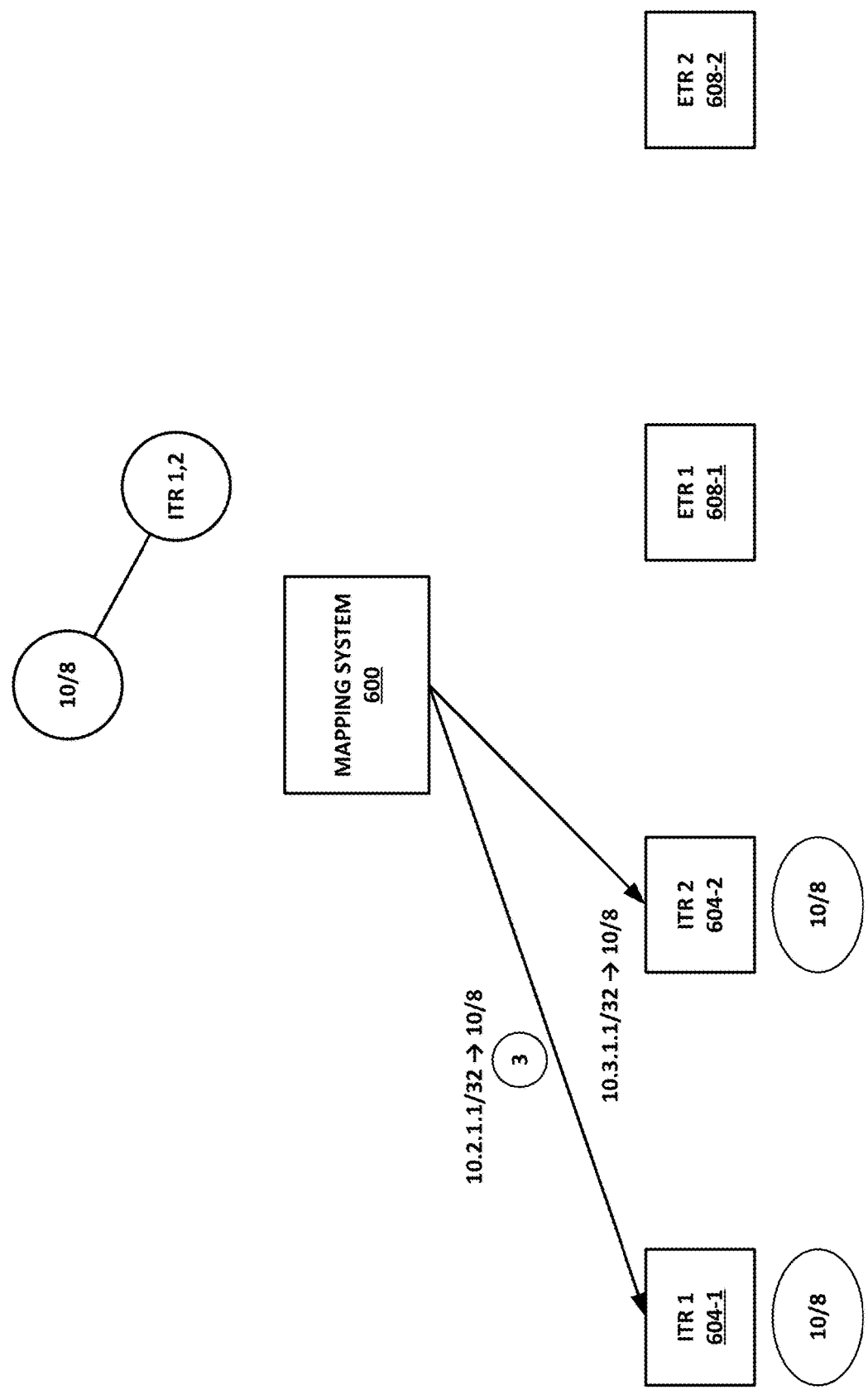

Turning to FIG. 8, at operation 3, mapping system 600 responds to ITR 1 604-1 with an RLOC for the 10/8 subnetwork.

This informs ITR 1 604-1 that EIDs in the 10/8 range are serviced by that RLOC.

Similarly, mapping system 600 responds to ITR 2 604-2 with the 10/8 RLOC for 10.3.1.1/32. ITR 2 604-2 now caches the 10/8 prefix and knows that EIDs in the 10/8 range route to that RLOC.

Figure 9:
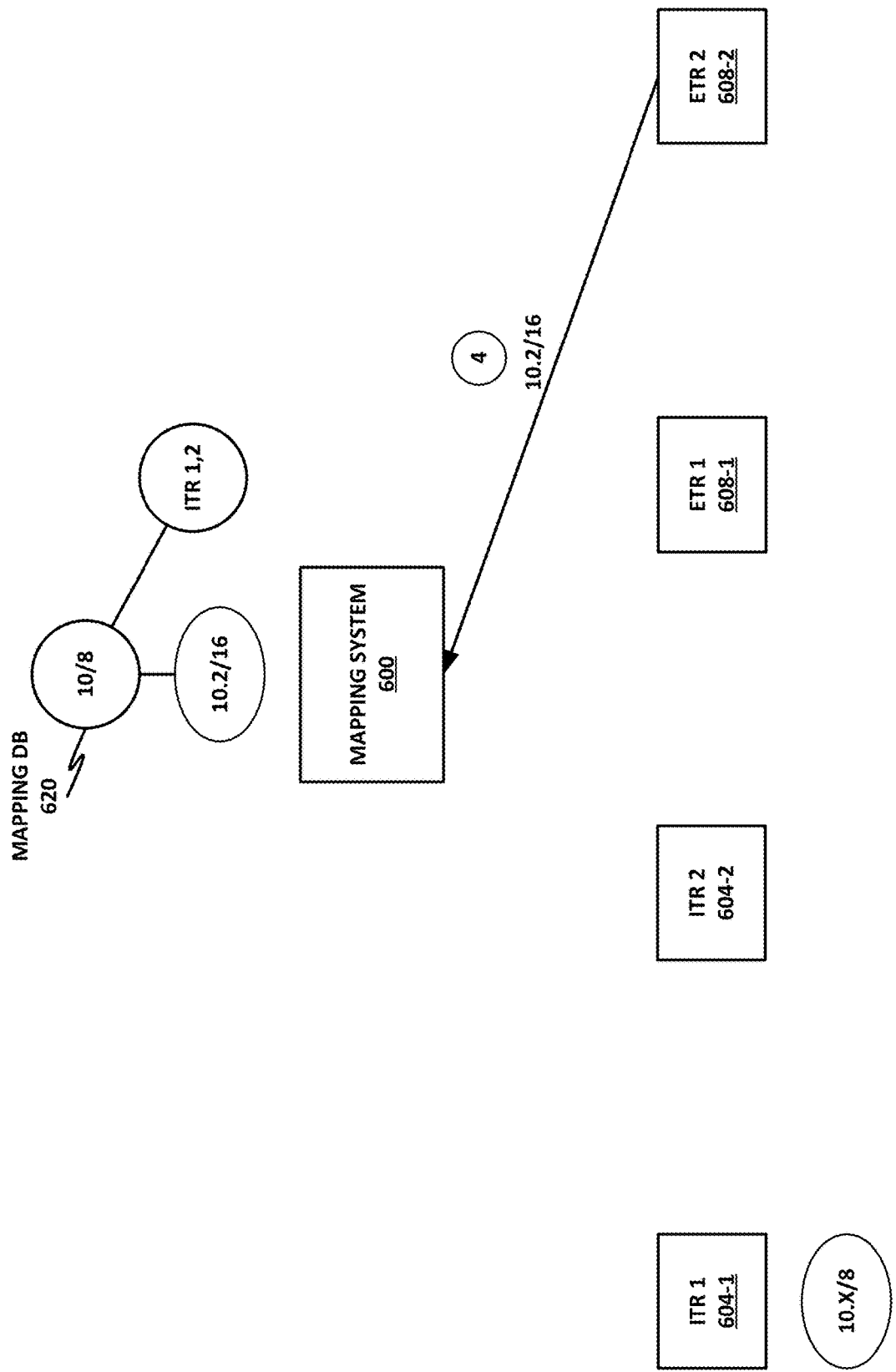

Turning to FIG. 9, at operation 4, ETR 2 608-2 now registers the overlapping subnetwork 10.2-16 to mapping system 600.

Mapping system 600 now adds to its radix tree in mapping database 620 a prefix for 10.2-16.

Figure 10:
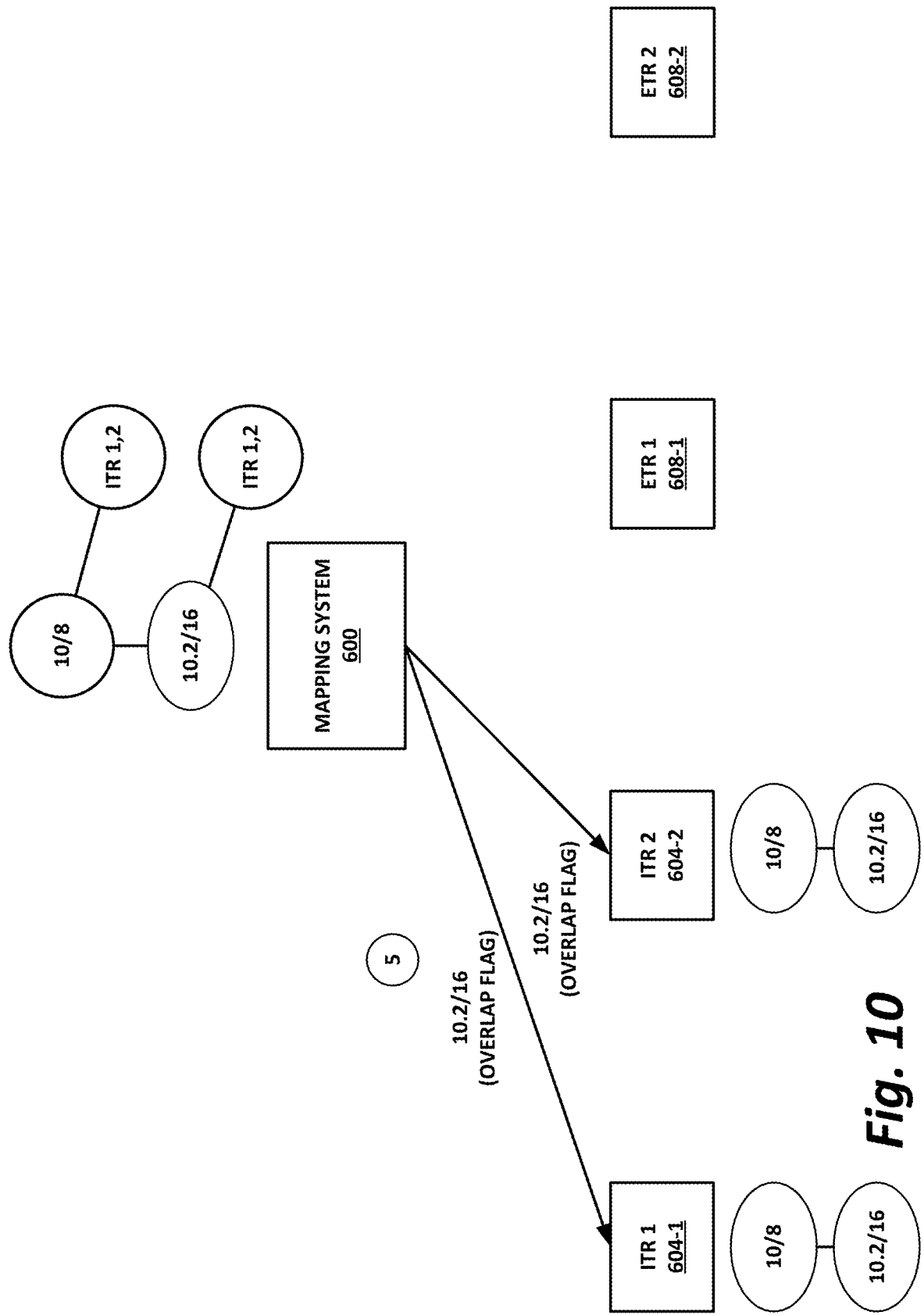

Turning to FIG. 10, at operation 5, to ensure that all ITRs 604 have the appropriate routing, mapping system 600 copies the subscription entries from the subscription table for the 10/8 prefix to the new 10.2/16 prefix. In this case, both ITR 1 604-1 and ITR 2 604-2 were subscribed to the 10/8 prefix. However, ITR 2 604-2 had only accessed EIDs outside of the 10.2/16 prefix. But because mapping system 600 does not retain a record of all queries, it does not keep states for which ITRs were accessing which overlapping subnetworks of 10/8. Thus, mapping system 600 publishes the new 10.2/16 mapping to both ITR 1 604-1 and ITR 2 604-2.

In other words, mapping system 600 walks through all registered prefixes that are less specific than 10.2/16. This is equivalent to walking all of the tree ancestors of 10.2/16. In this example, the only less specific prefix is 10/8. Thus, the subscriptions under every less specific registered prefix are copied to the new registration for 10.2/16, and the results are published to the corresponding ITRs.

In some embodiments, this unsolicited map published message may have an overlap flag associated with it. This indicates to the ITR 604 that this publication is the result of registration of a new overlapping prefix, and that the ITR should start an expiry timer on the subscription to 10.2/16 and all less specific (ancestor) subscriptions. Thus for example, when mapping system 600 publishes the 10.2/16 mapping to ITRs 604, each ITR 604 may set a new TTL, such as 24 hours, for both the 10.2/16 mapping, and the 10/8 mapping.

Figure 11:
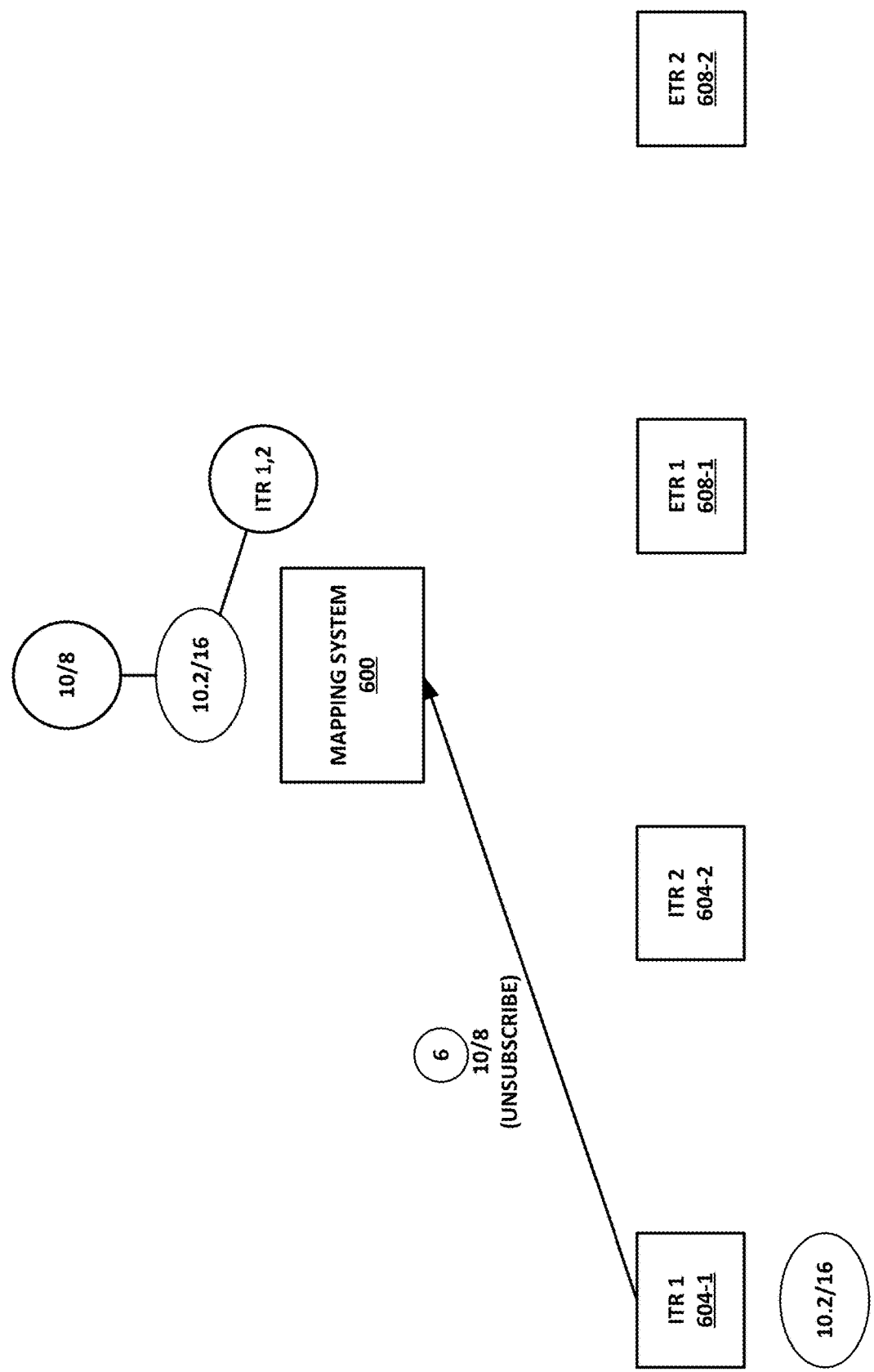

Turning to FIG. 11, an operation 6 is disclosed. As data packets are forwarded by the ITRs 604, the expiration timer is stopped on the longest matching subscription for each packet. When the timer on the remaining subscription expires, the ITR 604 may delete the expired subscription and send a map unsubscribe message to mapping system 600. Mapping system 600 then removes the subscription for the 10/8 prefix for ITRs 1 and 2 from the subscription table.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, controller 110 or xTRs300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiments, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

There is disclosed in one example, a Location/Identifier Separation Protocol (LISP) mapping server, comprising: a network interface for communicating with a LISP-enabled network; a mapping database; a subscription database; and an overlapping subscription publication engine (OSPE) to: receive a first mapping of a first subnetwork to a first routing locator (RLOC); add the first mapping to the mapping database; receive from a first ingress tunnel router (ITR) a subscription request for an endpoint identifier (EID) within the first subnetwork; add to a first subscription entry for the first subnetwork in the subscription database a subscription for the first ITR; receive a second mapping of a second subnetwork to a second RLOC, wherein the second subnetwork overlaps the first subnetwork; add the second mapping to the mapping database; and copy at least part of the first subscription entry to a second subscription entry for the second subnetwork.

There is further disclosed an example of a LISP mapping server, wherein the first EID is within the second subnetwork.

There is further disclosed an example of a LISP mapping server, wherein the OSPE is further to publish the mapping of the second subnetwork to the first ITR.

There is further disclosed an example of a LISP mapping server, wherein publishing the mapping of the second subnetwork comprises attaching a time to live (TTL) to the publication.

There is further disclosed an example of a LISP mapping server, wherein the OSPE is further to receive a mobility event for the second subnetwork comprising a new RLOC for the second network, and publish the new RLOC to the first ITR.

There is further disclosed an example of a LISP mapping server, wherein copying at least part of the first subscription entry to the second subscription entry for the second subnetwork comprises adding all subscribers of the first subscription entry as subscribers for the second subscription entry.

There is further disclosed an example of a LISP mapping server, wherein the OSPE is further to: receive from a second ITR a subscription entry for a second EID within the first subnetwork and not within the second subnetwork; and add the second ITR as a subscriber for the second subscription entry in the second database.

There is further disclosed an example of a LISP mapping server, wherein the OSPE is further to: receive from a second ITR a subscription entry for a second EID within the first subnetwork and not within the second subnetwork; and exclude the second ITR as a subscriber for the second subscription entry in the second database.

There is further disclosed an example of a LISP mapping server, wherein the OSPE is further to: receive a third mapping of a third subnetwork to a third RLOC, wherein the third subnetwork overlaps the second subnetwork; and copy all subscribers of the first subscription entry to a third subscription entry for the third subnetwork.

There is further disclosed an example of one or more tangible, non-transitory computer-readable storage mediums have stored thereon executable instructions for instructing one or more processors for providing an overlapping subscription publication engine (OSPE) for a Location/Identifier Separation Protocol (LISP) mapping server, the OSPE to: receive a first mapping of a first subnetwork to a first routing locator (RLOC); add the first mapping to a mapping database; receive from a first ingress tunnel router (ITR) a subscription request for an endpoint identifier (EID) within the first subnetwork; add to a first subscription entry for the first subnetwork in a subscription database a subscription for the first ITR; receive a second mapping of a second subnetwork to a second RLOC, wherein the second subnetwork overlaps the first subnetwork; add the second mapping to the mapping database; and copy at least part of the first subscription entry to a second subscription entry for the second subnetwork.

There is further disclosed an example of one or more tangible, non-transitory computer-readable storage mediums, wherein the first EID is within the second subnetwork.

There is further disclosed an example of one or more tangible, non-transitory computer-readable storage mediums, wherein the OSPE is further to publish the mapping of the second subnetwork to the first ITR.

There is further disclosed an example of one or more tangible, non-transitory computer-readable storage mediums, wherein publishing the mapping of the second subnetwork comprises attaching a time to live (TTL) to the publication.

There is further disclosed an example of one or more tangible, non-transitory computer-readable storage mediums, wherein copying at least part of the first subscription entry to the second subscription entry for the second subnetwork comprises adding all subscribers of the first subscription entry as subscribers for the second subscription entry. There is further disclosed an example of one or more tangible, non-transitory computer-readable storage mediums, wherein the OSPE is further to: receive from a second ITR a subscription entry for a second EID within the first subnetwork and not within the second subnetwork; and add the second ITR as a subscriber for the second subscription entry in the second database.

There is further disclosed an example of one or more tangible, non-transitory computer-readable storage mediums, wherein the OSPE is further to: receive a third mapping of a third subnetwork to a third RLOC, wherein the third subnetwork overlaps the second subnetwork; and copy all subscribers of the first subscription entry to a third subscription entry for the third subnetwork.

There is further disclosed an example of a computer-implemented method of providing an overlapping subscription publication engine (OSPE) for a Location/Identifier Separation Protocol (LISP) mapping server, comprising: receiving a first mapping of a first subnetwork to a first routing locator (RLOC); adding the first mapping to a mapping database; receiving from a first ingress tunnel router (ITR) a subscription request for an endpoint identifier (EID) within the first subnetwork; adding to a first subscription entry for the first subnetwork in a subscription database a subscription for the first ITR; receiving a second mapping of a second subnetwork to a second RLOC, wherein the second subnetwork overlaps the first subnetwork; adding the second mapping to the mapping database; and copying at least part of the first subscription entry to a second subscription entry for the second subnetwork.

There is further disclosed an example of a computer-implemented method, wherein copying at least part of the first subscription entry to the second subscription entry for the second subnetwork comprises adding all subscribers of the first subscription entry as subscribers for the second subscription entry.

There is further disclosed an example of a computer-implemented method, further comprising: receiving from a second ITR a subscription entry for a second EID within the first subnetwork and not within the second subnetwork; and adding the second ITR as a subscriber for the second subscription entry in the second database.

There is further disclosed an example of a computer-implemented method, further comprising: receiving a third mapping of a third subnetwork to a third RLOC, wherein the third subnetwork overlaps the second subnetwork; and copying all subscribers of the first subscription entry to a third subscription entry for the third subnetwork.

What is claimed is:

1. A method comprising:
    obtaining, by a mapping device, a second mapping of a second subnetwork to a second routing locator (RLOC), the second subnetwork partially overlapping with a first subnetwork mapped to a first RLOC in a first mapping stored in a mapping database;
    adding, by the mapping device, the second mapping to the mapping database; and
    subscribing, by the mapping device, an ingress tunnel router to the second subnetwork based on the ingress tunnel router being subscribed to the first subnetwork and by adding, in a subscription database, by the mapping device, a subscription entry in which the ingress tunnel router is subscribed to be notified of a routing change with respect to the second subnetwork.

2. The method of claim 1, further comprising:
    obtaining, by the mapping device, the first mapping of the first subnetwork to the first RLOC; and
    adding, by the mapping device, the first mapping to the mapping database.

3. The method of claim 2, further comprising:
    obtaining, by the mapping device from the ingress tunnel router, a first subscription request for an endpoint identifier within the first subnetwork; and
    adding, in the subscription database, by the mapping device, a first subscription entry in which the ingress tunnel router is subscribed to the first subnetwork.

4. The method of claim 3, wherein subscribing the ingress tunnel router to the second subnetwork includes:
    copying, by the mapping device, the first subscription entry to a second subscription entry in the subscription database for the second subnetwork.

5. The method of claim 4, further comprising:
publishing, by the mapping device to the ingress tunnel router, a notification indicating that the ingress tunnel router is subscribed to the second subnetwork that overlaps with the first subnetwork.

6. The method of claim 1, further comprising:
obtaining, from the subscription database, at least one subscription entry for another subnetwork that overlaps with the second subnetwork and has less specific prefixes than the second subnetwork; and
copying the at least one subscription entry to a second subscription entry for the second subnetwork.

7. The method of claim 1, wherein subscribing to the second subnetwork includes searching, by the mapping device, through a radix tree and determining a longest matching prefix in the mapping database.

8. The method of claim 1, wherein the first subnetwork has a first set of prefixes and the second subnetwork has a second set of prefixes that are more specific than the first set of prefixes.

9. An apparatus comprising:
a communication interface configured to enable network communications;
a memory configured to store executable instructions; and
a processor coupled to the communication interface and the memory and configured to perform operations including:
obtaining a second mapping of a second subnetwork to a second routing locator (RLOC), the second subnetwork partially overlapping with a first subnetwork mapped to a first RLOC in a first mapping stored in a mapping database;
adding the second mapping to the mapping database; and
subscribing an ingress tunnel router to the second subnetwork based on the ingress tunnel router being subscribed to the first subnetwork and by adding, in a subscription database, a subscription entry in which the ingress tunnel router is subscribed to be notified of a routing change with respect to the second subnetwork.

10. The apparatus of claim 9, wherein the processor is further configured to perform the operations including:
obtaining the first mapping of the first subnetwork to the first RLOC; and
adding the first mapping to the mapping database.

11. The apparatus of claim 10, wherein the processor is further configured to perform the operations including:
obtaining, from the ingress tunnel router, a first subscription request for an endpoint identifier within the first subnetwork; and
adding, in the subscription database, a first subscription entry in which the ingress tunnel router is subscribed to the first subnetwork.

12. The apparatus of claim 11, wherein the processor performs subscribing the ingress tunnel router to the second subnetwork by:
copying the first subscription entry to a second subscription entry in the subscription database for the second subnetwork.

13. The apparatus of claim 12, wherein the processor is further configured to perform the operations including:
publishing, to the ingress tunnel router, a notification indicating that the ingress tunnel router is subscribed to the second subnetwork that overlaps with the first subnetwork.

14. The apparatus of claim 9, wherein the processor is further configured to perform the operations including:
obtaining, from the subscription database, at least one subscription entry for another subnetwork that overlaps with the second subnetwork and has less specific prefixes than the second subnetwork; and
copying the at least one subscription entry to a second subscription entry for the second subnetwork.

15. One or more non-transitory computer readable storage media encoded with software comprising computer executable instructions operable to perform operations comprising:
obtaining a second mapping of a second subnetwork to a second routing locator (RLOC), the second subnetwork partially overlapping with a first subnetwork mapped to a first RLOC in a first mapping stored in a mapping database;
adding the second mapping to the mapping database; and
subscribing an ingress tunnel router to the second subnetwork based on the ingress tunnel router being subscribed to the first subnetwork and by adding, in a subscription database, a subscription entry in which the ingress tunnel router is subscribed to be notified of a routing change with respect to the second subnetwork.

16. The one or more non-transitory computer readable storage media of claim 15, wherein the operations further include:
obtaining the first mapping of the first subnetwork to the first RLOC; and
adding the first mapping to the mapping database.

17. The one or more non-transitory computer readable storage media of claim 16, wherein the operations further include:
obtaining, from the ingress tunnel router, a first subscription request for an endpoint identifier within the first subnetwork; and
adding, in the subscription database, a first subscription entry in which the ingress tunnel router is subscribed to the first subnetwork.

18. The one or more non-transitory computer readable storage media of claim 17, wherein subscribing the ingress tunnel router to the second subnetwork includes:
copying the first subscription entry to a second subscription entry in the subscription database for the second subnetwork.

19. The one or more non-transitory computer readable storage media of claim 18, wherein the operations further include:
publishing, to the ingress tunnel router, a notification indicating that the ingress tunnel router is subscribed to the second subnetwork that overlaps with the first subnetwork.

20. The one or more non-transitory computer readable storage media of claim 15, wherein the operations further include:
obtaining, from the subscription database, at least one subscription entry for another subnetwork that overlaps with the second subnetwork and has less specific prefixes than the second subnetwork; and
copying the at least one subscription entry to a second subscription entry for the second subnetwork.

* * * * *